(12) United States Patent
Ngo

(10) Patent No.: US 7,775,123 B2
(45) Date of Patent: Aug. 17, 2010

(54) WELD INSPECTION RIG AND RELATED METHOD FOR USE

(75) Inventor: Anh-Tuan Ngo, Phoenix, AZ (US)

(73) Assignee: Honeywell International Inc., Morristown, NJ (US)

(\*) Notice: Subject to any disclaimer, the term of this patent is extended or adjusted under 35 U.S.C. 154(b) by 0 days.

(21) Appl. No.: 12/276,025

(22) Filed: Nov. 21, 2008

(65) Prior Publication Data

US 2010/0126280 A1 May 27, 2010

(51) Int. Cl.
*G01N 3/20* (2006.01)
(52) U.S. Cl. .......................................... 73/850; 73/760
(58) Field of Classification Search .................... 73/760, 73/850
See application file for complete search history.

(56) References Cited

U.S. PATENT DOCUMENTS

| | | | |
|---|---|---|---|
| 3,652,224 A | 3/1972 | Johnson et al. | |
| 4,177,913 A * | 12/1979 | Iwamoto et al. | 228/9 |
| 4,677,856 A * | 7/1987 | Fischer | 73/850 |
| 5,024,364 A * | 6/1991 | Nash | 277/364 |
| 5,111,048 A | 5/1992 | Devitt et al. | |
| 5,554,800 A | 9/1996 | Jonsson | |
| 5,597,959 A * | 1/1997 | Rice et al. | 73/850 |
| 6,612,184 B1 * | 9/2003 | Hollingsworth et al. | 73/827 |
| 6,848,322 B2 * | 2/2005 | Scarborough | 73/850 |
| 2007/0248202 A1 * | 10/2007 | Carson et al. | 376/204 |

\* cited by examiner

*Primary Examiner*—Max Noori
(74) *Attorney, Agent, or Firm*—Ingrassia Fisher & Lorenz, P.C.

(57) ABSTRACT

A weld inspection device is disclosed. The weld inspection device comprises a first annular engagement portion surrounding a central axis and a second annular engagement portion. The first annular engagement portion has a first holed segment extending circumferentially around an outer edge of the first annular engagement portion and having a first hole adapted to receive a threaded member and a standoff segment extending in a first direction along the central axis from the first holed segment, the standoff segment having a concavity. The second annular engagement portion surrounds the central axis and has a second holed segment extending circumferentially around the central axis and having a second hole adapted to receive and threadedly engage a threaded member, and a retaining flange extending radially inward toward the central axis.

19 Claims, 2 Drawing Sheets

WELD INSPECTION RIG AND RELATED METHOD FOR USE

TECHNICAL FIELD

Embodiments of the subject matter described herein relate generally to inspection rigs. More particularly, embodiments of the subject matter relate to load-inducing inspection rigs.

BACKGROUND

Inspection of welds in components for developing defects, including cracks, is an important and necessary safety procedure. Components operating while experiencing loads can develop defects over time, such as those associated with cyclical fatigue or degradation from wear. Determining the presence and extent of such defects allows an opportunity to repair or replace components.

Defects that can develop under operating conditions can sometimes be difficult to locate during unloaded conditions. For example, a component undergoing strain during operation experiences the operating loads in a deformed shape, as opposed to an unloaded, undeformed shape. When the deformed shape develops defects, they may not be readily observable in the undeformed shape.

One example of difficulty in locating defects occurs in welds. Certain welds, when operating, can develop cracks while bending under strain. After the operating load is removed, the release of strain through unbending can close the cracks, making detection difficult, even with penetrating inspection techniques, such as Fluorescent Penetrant Inspection (FPI).

BRIEF SUMMARY

A weld inspection device is disclosed. The weld inspection device comprises a first annular engagement portion surrounding a central axis and a second annular engagement portion. The first annular engagement portion has a first holed segment extending circumferentially around an outer edge of the first annular engagement portion and having a first hole adapted to receive a threaded member and a standoff segment extending in a first direction along the central axis from the first holed segment, the standoff segment having a concavity. The second annular engagement portion surrounds the central axis and has a second holed segment extending circumferentially around the central axis and having a second hole adapted to receive and threadedly engage a threaded member, and a retaining flange extending radially inward toward the central axis.

An inspection rig for detecting cracks in a weld of a plenum flange having a corner is also disclosed. The inspection rig comprises a first annular flange surrounding a central axis, the first annular flange comprising an axial portion extending in a direction parallel to the central axis, the axial portion having a radial seat extending circumferentially around the first annular flange, the radial seat adapted to receive the corner of the plenum flange, and a second annular flange surrounding the central axis, the second annular flange having a retaining flange extending radially inward toward the central axis.

A method of loading a circular flange for defect inspection is also disclosed. The circular flange surrounds a central axis and has an axial portion, a radial portion, a weld, and a shoulder joining the axial and radial portions, the shoulder having an inner corner and an outer corner. The method comprises positioning a first annular ring against the outer corner of the shoulder, the first annular ring comprising a first plurality of holes, coupling a second annular ring having a retention flange to the first annular ring such that the retention flange is coupled to the radial portion, the second annular ring comprising a second plurality of holes, inserting a plurality of bolts such that each bolt extends through one of the first plurality of holes and one of the second plurality of holes, and rotating each of the plurality of bolts, thereby causing strain in the weld.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
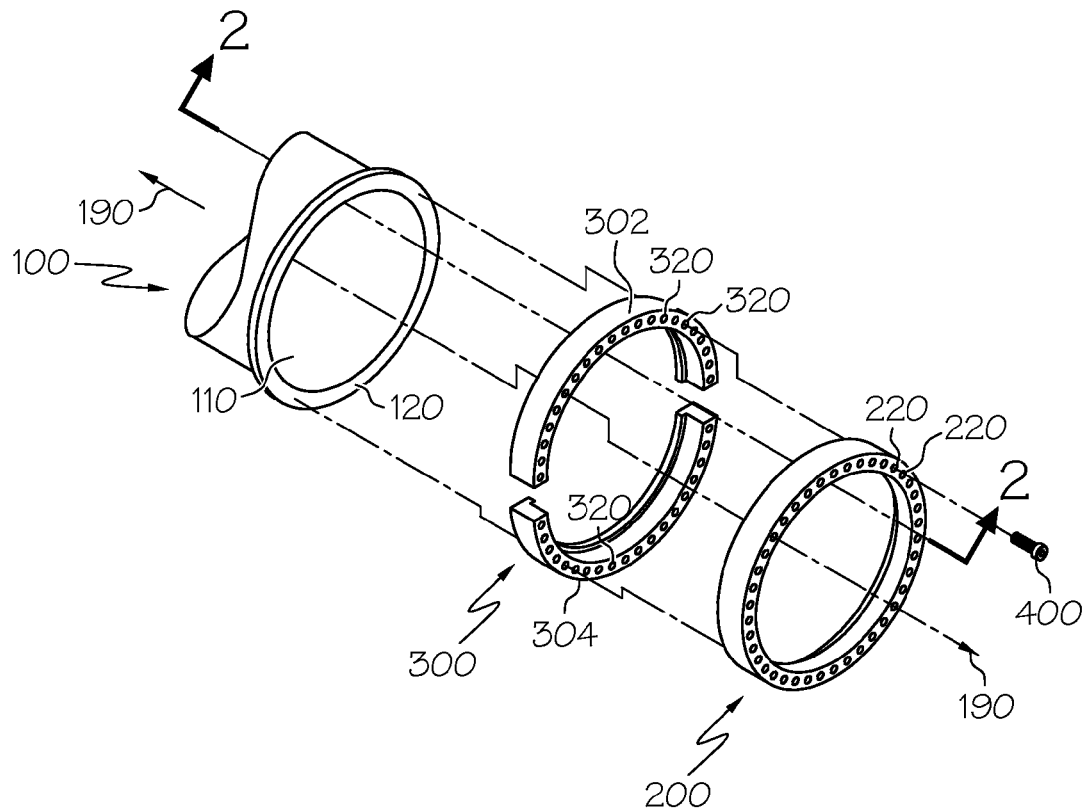
FIG. 1 is an exploded perspective view of a plenum having a flange and an inspection rig.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper," "lower," "above," and "below" refer to directions in the drawings to which reference is made. Terms such as "front," "back," "rear," "side," "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

Figure 2:
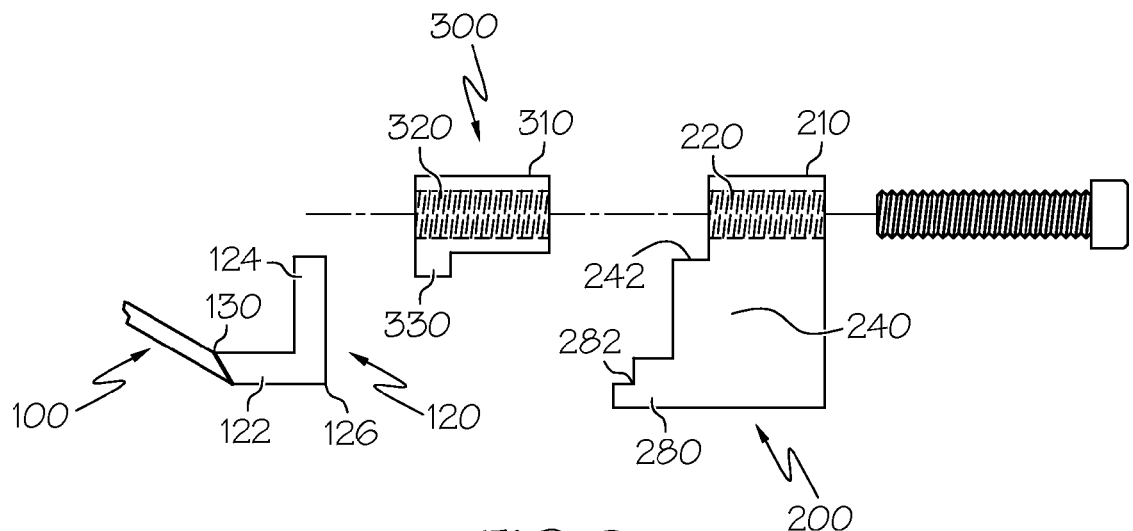
FIG. 2 is a detailed view of cross-section of the plenum flange and inspection rig of FIG. 1.
Figure 3:
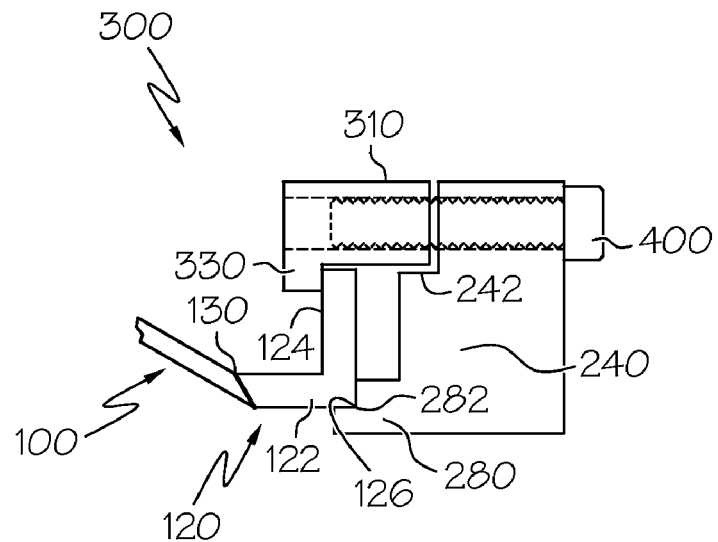
FIG. 3 is an assembled view of the plenum flange and inspection rig of FIG. 2.

FIG. 1 illustrates an exploded view of an embodiment of a plenum 100 having a plenum flange 120 and first and second annular members 200, 300 of an inspection rig. The first and second annular members 200, 300 can be coupled to the plenum 100 by at least one bolt 400. FIG. 2 illustrates a detailed view of a cross-section of the exploded view of FIG. 1. FIG. 3 illustrates an assembled view of the plenum 100 with the first and second annular members 200, 300, as coupled together by the bolt 400. By adjusting the position of the bolt 400, the first and second annular members 200, 300 can impart a static load on the plenum flange 120. When properly engaged, the plenum flange 120 can be subjected to strain similar to that encountered during operation, allowing for inspection of the plenum 100 under operating strain in a controlled manner.

With reference to FIGS. 1 and 2, the plenum 100 and annular members 200, 300 are described in an exploded view. The plenum 100 can be of any types typically used in an engine, such as a turbine engine, or other pressure-loading components. The plenum 100 can be composed of steel, including stainless steel, or any other metal appropriate to the embodiment.

Preferably, at least one portion of the plenum 100 terminates in a circular aperture 110. The plenum 100 can have a plenum flange 120, among other features and components. Preferably, the plenum flange 120 extends circumferentially around the aperture 110. The plenum flange 120 preferably extends radially outward, as shown. As used herein, such orienting terms as "radially," "axially," "inward," and "outward" are used with reference to a axis 190 extending through the plenum at the center of the circular aperture 110.

The plenum flange 120 can be fabricated independently from the rest of the plenum 100. Consequently, later attachment can be accomplished through any suitable technique, although in the illustrated embodiment, a weld 130 is used. The weld 130 can be a Metal Inert Gas (MIG) weld, a Tungsten Inert Gas (TIG) weld, or any other type appropriate to the plenum 100 embodiment. The weld 130 preferably extends circumferentially around the plenum 100, coupling the plenum flange 120 to it. During operation, the weld 130 can be exposed to stress by forces exerted on the plenum flange 120.

The plenum flange 120 preferably comprises both a radial portion 124 and an axial portion 122. The radial portion 124 of the plenum flange 120 is coupled to the plenum 100 by the weld 130. The radial portion 124 connects to the axial portion 122 at a bend having an outer corner 126. The outer corner 126, though illustrated as a sharp right-angle, can be embodied in less steeply-angled shapes, including some with a surface that is at least partially rounded. The outer corner 126 has a matching inward corner.

During operation of the plenum 100, a component will be coupled to the plenum flange 120. The plenum flange 120 will experience an operational load in the axial direction. With reference to FIG. 3, the load imparted on the plenum flange 120 during operation will be in the right direction, away from the plenum 100. Consequently, the weld 130 will experience a strain while retaining the plenum flange 120 to the plenum 100.

The first annular member 200 has a ring shape centered about the axis 190. Preferably, the outer diameter of the first annular member 200 is greater than the outer diameter of the radial end of the radial portion 124. Additionally, preferably the inner diameter of the first annular member 200 is smaller than the innermost edge of the plenum flange 120. Thus, the first annular member 200 preferably extends at least entirely along the radial length of the radial portion 124. The first annular member 200 is preferably composed of a metal, such as a steel, including a stainless steel, aluminum, titanium, a composite, a ceramic, or other material sufficiently stiff to perform the functions described. Additionally, a lighter-weight material is preferred, where appropriate, to facilitate assembly, disassembly, and transport of the first and second annular members 200, 300.

The first annular member 200 preferably comprises a holed segment 210, a raised segment 240, and a standoff segment 280. In certain embodiments, the first annular member 200 is a single, integrally-formed component. In some embodiments, the holed segment 210 and raised segments 240 can be separate components and coupled together, if desired. The standoff segment 280 can be integrally-formed with one or more other segments, or separate, as well. In certain embodiments, different segments can be coupled by fastener, bonding agent, welding, or other technique, as appropriate to the embodiment.

The holed segment 210 preferably extends circumferentially around the outer perimeter of the first annular member 200. The holed segment 210 comprises a plurality of holes 220 through the first annular member 200. Each hole 220 preferably has an interior threaded surface. Other surfaces are possible, as described in greater detail below. The hole 220 is preferably of appropriate size, and the threaded surface preferably of appropriate pitch, to accommodate a standard size bolt as desired for the embodiment. In the illustrated embodiment, bolt 400 represents one embodiment of a bolt, but other bolts and/or engagement techniques can be used.

The holed segment 210 preferably has at least four holes 220, but can have many more, limited only by the physical size of the holed segment 210 and the size of the holes 220. The illustrated embodiment has forty holes in the holed segment 210, though more are fewer can be used. As seen in FIG. 2, each hole preferably extends completely through the holed segment 210 of the first annular member in a radial direction.

The first annular member 200 also comprises a raised segment 240. The raised segment 240 extends axially away from the holed segment 210. The raised segment 240 comprises an axial contact surface 242 adjacent the holed segment 210. As can be seen, the raised segment 240 is preferably thicker in the axial direction than the holed segment 210. The contact surface 242 can couple with the second annular member 300 to align the first and second annular members 200, 300 for engagement with the bolt 400, as described below.

The standoff segment 280 preferably extends beyond the raised segment 240, as shown. The standoff segment 280 comprises a notch, shoulder, or concavity 282, as shown. Preferably, the concavity 282 has a shape adapted to receive the outer corner 126. Thus, in the illustrated embodiment, the concavity 282 is shaped to receive a right angle. In certain embodiments, the concavity 282 can have a curved or radiused shape, as appropriate to receive the outer corner 126. Accordingly, the concavity 282 can be variously embodied as a notch, a groove, a channel, a ledge, or other shape suitable to engage the outer corner 126. The concavity 282 preferably has a radial surface, to provide a surface for reaction for the outer corner 126, as described below.

Although the first annular member 200 is described as in isolation, the features used to couple to the plenum 100, second annular member 300, and bolt 400 can be present in other devices. Consequently, in some embodiments, the first annular member 200 can be a plurality of separate components coupled together to perform the functions described.

The second annular member 300 preferably comprises a plurality of segments adapted to combine to form an annular device. In the illustrated embodiment, an upper and lower annular segment 302, 304 are shown. In other embodiments, more segments can combine to create the second annular member 300. Preferably, the segments combine to create a circular member, as shown. Thus, four segments, each covering approximately 90° of arc around the axis 190 can be used, and so on. Each segment is preferably adapted to be selectively coupled to adjoining segments in a suitable manner, such as by fastener, such as a bolt, latch, and other mechanical technique. In certain embodiments, the segments can be hinged at one coupling to ensure the segments are not lost when stored separately.

In the illustrated embodiment, the upper annular segment 302 is preferably selectively coupled to the lower annular segment 304 by at least one threaded member at each connection. Accordingly, the second annular member 300 can be separated, and recoupled around the plenum flange 120, as shown. Hereafter, the second annular member 300 is described in its assembled state, with the upper and lower segments 302, 304 coupled together for purposes of describing the interaction with the plenum flange 120.

The second annular member 300 comprises a holed segment 310 having a plurality of holes 320 and a retention flange 330. The second annular member 300 is a ring-shaped component centered about the axis 190. The second annular member 300 can have an outer diameter greater than the greatest radial extent of the plenum 100. As shown, the outer diameter of the second annular member 300 can be about the same as that of the first annular member 200. The second annular member 300 preferably can be coupled to the first annular member 200 by a bolt 400, or plurality of bolts. The second annular member 300 is preferably composed of a similar material as the first annular member 200, and can be the same.

The holed segment 310 comprises a plurality of holes 320. Each hole 320 preferably comprises an interior threaded surface adapted to engage the bolt 400 or another similar threaded member. Preferably, each hole 320 extends completely through the holed segment 310 in an axial direction. When engaged with the first annular member 200, an axial surface of the holed segment 310 can be aligned to couple with the first annular member 200 along the contact surface 242, as shown in FIG. 3.

The retention flange 330 preferably extends radially inward. The length of the retention flange 330 can vary between embodiments, but preferably extends sufficiently inward to engage and retain the radial portion 124, as shown in FIG. 3.

The bolt 400 is a threaded member adapted to engage the threaded surfaces of the holes 220, 320 of the holed segments 210, 310. Although a bolt 400 is shown, other threaded members also can be used. Preferably, such a threaded member couples the first and second annular members 200, 300 by engaging the threaded surfaces within the holes 220, 320. Rotation of the engaged threaded member thereby decreases or increases the distance between the holes 220, 320, resulting in the desired loading of the plenum flange 120, as described below.

During operation, the first and second annular members 200, 300 can be coupled together by the bolt 400, or plurality of bolts. As shown in FIG. 3, the first and second annular members 200, 300 can couple to and engage the plenum flange 120. Preferably, the first annular member 200 is positioned such that the concavity receives the outer corner 126. The second annular member 300 is preferably positioned such that the retention flange 330 is disposed against the side of radial portion 124 near the weld 130. Consequently, by inserting the bolt 400 through the hole 220 in the first annular member 200 aligned with the hole 320 in the second annular member 300 and threadedly engaging the bolt 400, the first and second annular members 200, 300 can be secured to the plenum flange 120.

As shown, the bolt 400 can extend through both holes 220, 320. Preferably, when the bolt 400 is inserted in the direction shown, the interior surfaces of the holes 220 in the first annular member 200 are smooth, while the surfaces of the holes 320 in the second annular member 300 are threaded and engage the bolt 400. Accordingly, rotation of the bolt 400 adjusts the position of the second annular member 300 relative to the first annular member 200, when the first annular member 200 is stationary. Certain embodiments can operate in the reverse, where the bolts 400 are inserted from the other direction. In such embodiments, the surfaces of the holes 220 of the first annular member 200 are threaded, while the surfaces of the holes 320 of the second annular member 300 are smooth.

Preferably, a plurality of bolts is used, one for each hole 220, 320 of the first and second annular members 200, 300. Each bolt is preferably engaged with the threaded surface of each of the holes 220, 320. During installation of the bolts, they are preferably tightened in a rotating pattern to prevent sequential loading of the first and second annular members 200, 300. Thus, the circular arrangement of bolts can be rotated in a star-shaped pattern, wherein a first bolt is rotated and a second bolt is subsequently rotated, wherein the second bolt is across the ring from the first bolt, and offset slightly. The pattern can be continued until all bolts are properly tightened.

By continuing to rotate the bolt 400 after engagement of the arrangement depicted in FIG. 3, the bolt 400 will exert a force on the first and second annular members 200, 300, biasing them towards each other. Because the first annular member 200 contacts the plenum flange 120 along its inner edge while the second annular member 300 contacts the plenum flange 120 along the radial portion 124, a rotational force is imparted to the plenum flange 120. With reference to the detailed view shown in FIG. 3, the plenum flange 120 is biased to rotate clockwise by the forces received from the first and second annular members 200, 300. Because the plenum flange 120 and the first and second annular members 200, 300 are circular, however, the moment experienced by the plenum flange 120 will be directed inward. Consequently, the weld 130 will experience a strain from the inward loading similar to the load the weld 130 experiences during operation conditions, as described above. After imparting a strain to the weld 130 similar to that experienced during operating conditions, the weld 130 can be inspected for defects in its deformed shape, permitting a more effective inspection than inspection of the undeformed shape.

As part of proper loading of the plenum flange 120, a strain gauge or other strain measure device can be affixed to the plenum 100 along the weld 130. The strain gauge can be used as a feedback device to determine that a desired amount of strain in the weld 130 has been attained. Thus, with a knowledge of the strain experienced by the weld 130 during operation, the bolt 400, or each of the plurality of bolts, can be rotated, imparting forces to the plenum flange 120 until the strain gauge measures a strain identical to, or acceptably near, the strain experienced by the weld 130 during normal operation.

Figure 4:
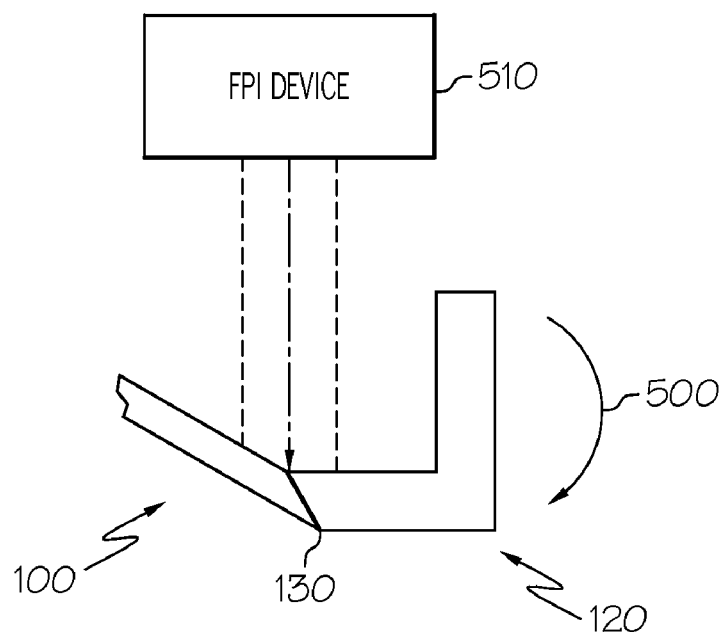
FIG. 4 is a diagram of a plenum flange under load during inspection.

Subsequent to positioning of the annular members 200, 300 and desired loading of the weld 130, the plenum 100, particularly the weld 130, can be inspected for defects. FIG. 4 is a diagram of the plenum 100 undergoing inspection. Unless otherwise specified, the plenum 100 illustrated in FIG. 4 is substantially the same as the plenum 100 described above in reference to FIGS. 1-3, except that the annular members 200, 300 have been omitted for clarity.

The moment experienced by the plenum flange 120 resulting from engagement by the first and second annular members 200, 300 is shown as the arrow 500. Following loading, the plenum flange 120, particularly the weld 130 can be inspected for defects. Such inspection is preferably performed using a fluorescent penetrant inspection (FPI) device 500. One such device is shown, though other penetrant inspection device and techniques can also be used. Thus, after loading, a FPI device 500 practicing a penetrant inspection technique can be used to inspect the weld 130.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A weld inspection device comprising:
   a first annular engagement portion surrounding a central axis, the first annular engagement portion having:
      a first holed segment extending circumferentially around an outer edge of the first annular engagement portion and having a first hole adapted to receive a threaded member; and
      a standoff segment extending in a first direction along the central axis from the first holed segment, the standoff segment having a concavity; and
   a second annular engagement portion surrounding the central axis, the second annular engagement portion having:
      a second holed segment extending circumferentially around the central axis and having a second hole adapted to receive and threadedly engage a threaded member; and
      a retaining flange extending radially inward toward the central axis.

2. The weld inspection device of claim 1, wherein the first annular engagement portion further comprises a raised segment between the first holed segment and the standoff segment, the raised segment extending in the first direction and extending circumferentially around the first annular engagement portion.

3. The weld inspection device of claim 2, wherein the first and second holed segments are adapted to receive the same threaded member.

4. The weld inspection device of claim 1, wherein the first holed segment comprises a first plurality of holes, each adapted to receive one of a first plurality of threaded members.

5. The weld inspection device of claim 4, wherein the second holed segment comprises a second plurality of holes, each adapted to receive one of the first plurality of threaded members.

6. The weld inspection device of claim 1, further comprising a bolt extending axially through the first hole and the second hole, thereby coupling the first annular engagement portion to the second annular engagement portion.

7. The weld inspection device of claim 1, further comprising a strain gauge adapted to detect a strain in an object experiencing a load imparted by the first and second annular engagement portion.

8. The weld inspection device of claim 7, further comprising a penetrant inspection device adapted to inspect the object for defects while the object is experiencing the load imparted by the first and second annular engagement portions.

9. An inspection rig for detecting cracks in a weld of a plenum flange having a corner, the inspection rig comprising:
   a first annular flange surrounding a central axis, the first annular flange comprising a first plurality of holes and an axial portion extending in a direction parallel to the central axis, the axial portion having a radial seat extending circumferentially around the first annular flange, the radial seat adapted to receive the corner of the plenum flange; and
   a second annular flange surrounding the central axis, the second annular flange comprising a second plurality of holes aligned with the first plurality of holes and having a retaining flange extending radially inward toward the central axis.

10. The inspection rig of claim 9, wherein the second annular flange comprises a plurality of coupled flange segments.

11. The inspection rig of claim of claim 9, further comprising a plurality of bolts, each bolt adapted to couple the first annular flange to the second annular flange by extending through one of the first plurality of holes and one of the second plurality of holes.

12. The inspection rig of claim 11, wherein the inspection rig is adapted to cause strain in the plenum flange by rotating one of the plurality of bolts.

13. The inspection rig of claim 9, wherein the plenum flange further comprises a radial segment and the second annular flange is positioned to contact the radial segment with the retaining flange.

14. A method of loading a circular flange for defect inspection, the circular flange surrounding a central axis and having an axial portion, a radial portion, a weld, and a shoulder joining the axial and radial portions, the shoulder having an inner corner and an outer corner, the method comprising:
- positioning a first annular ring against the outer corner of the shoulder, the first annular ring comprising a first plurality of holes;
- coupling a second annular ring having a retention flange to the first annular ring such that the retention flange is coupled to the radial portion, the second annular ring comprising a second plurality of holes;
- inserting a plurality of bolts such that each bolt extends through one of the first plurality of holes and one of the second plurality of holes; and
- rotating each of the plurality of bolts, thereby causing strain in the weld.

15. The method of claim 14, wherein rotating each of the plurality of bolts comprises rotating each of the plurality of bolts in a pattern.

16. The method of claim 14, wherein the method further comprising attaching a strain gauge to the circular flange at a position along the weld.

17. The method of claim 15, wherein rotating each of the plurality of bolts comprises rotating each of the plurality of bolts until the strain gauge detects a predetermined amount of strain in the weld.

18. The method of claim 17, further comprising inspecting the weld using a fluorescent penetrant inspection technique after rotating each of the plurality of bolts until the strain gauge detects the predetermined amount of strain in the weld.

19. The method of claim 14, wherein the first annular ring comprises a groove, and positioning the first annular ring comprises positioning the outer corner of the shoulder in the groove.

* * * * *

UNITED STATES PATENT AND TRADEMARK OFFICE
CERTIFICATE OF CORRECTION

PATENT NO. : 7,775,123 B2  
APPLICATION NO. : 12/276025  
DATED : August 17, 2010  
INVENTOR(S) : Ngo Page 1 of 1

It is certified that error appears in the above-identified patent and that said Letters Patent is hereby corrected as shown below:

Column 8, line 53, "The inspection rig of claim of claim 9," should be changed to --The inspection rig of claim 9,--.

Signed and Sealed this  
Twenty-eighth Day of December, 2010

David J. Kappos  
*Director of the United States Patent and Trademark Office*